United States Patent
Im (10) Patent No.: US 8,502,930 B2
(45) Date of Patent: Aug. 6, 2013

(54) ELECTRICALLY-DRIVEN LIQUID CRYSTAL LENS AND STEREOSCOPIC DISPLAY DEVICE USING THE SAME

(75) Inventor: Hee Jin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 312 days.

(21) Appl. No.: 12/956,122

(22) Filed: Nov. 30, 2010

(65) Prior Publication Data

US 2011/0157496 A1    Jun. 30, 2011

(30) Foreign Application Priority Data

Dec. 30, 2009   (KR) .................. 10-2009-0134354

(51) Int. Cl.
*G02F 1/1335* (2006.01)
*G02F 1/1347* (2006.01)
*G02F 1/13* (2006.01)

(52) U.S. Cl.
USPC ............................. 349/15; 349/74; 349/200

(58) Field of Classification Search
USPC ............................. 349/15, 74, 200
See application file for complete search history.

(56) References Cited

U.S. PATENT DOCUMENTS

| 2006/0215262 A1* | 9/2006 | Kim ........................ 359/465 |
| 2009/0153754 A1* | 6/2009 | Jung ........................ 349/15 |
| 2010/0085513 A1* | 4/2010 | Chiba et al. ................ 349/74 |

* cited by examiner

*Primary Examiner* — Jessica M Merlin
(74) *Attorney, Agent, or Firm* — Morgan, Lewis & Bockius LLP

(57) ABSTRACT

Disclosed are an electrically-driven liquid crystal lens which includes a light shade to be switched on/off according to whether or not voltage is applied, reducing a cell gap of a liquid crystal layer, and a stereoscopic display device using the same, the electrically-driven liquid crystal lens includes first and second substrates opposite each other and each including plural lens regions and a light shade provided at a boundary of each lens region, first electrodes formed in a given direction on the first substrate in each lens region, a second electrode formed on the second substrate and having an aperture corresponding to the light shade, first and second light shade switching electrodes formed at the light shade and extending parallel to the first electrodes, a liquid crystal layer between both the substrates, and a polarizer plate formed above the second substrate and having a first transmission axis.

8 Claims, 6 Drawing Sheets

ELECTRICALLY-DRIVEN LIQUID CRYSTAL LENS AND STEREOSCOPIC DISPLAY DEVICE USING THE SAME

This application claims the benefit of the Korean Patent Application No. 10-2009-0134354, filed on Dec. 30, 2009, which is hereby incorporated by reference as if fully set forth herein.

BACKGROUND OF THE INVENTION

1. Field of the Invention

The present invention relates to an electrically-driven liquid crystal lens, and more particularly, to an electrically-driven liquid crystal lens which includes a light shade to be switched on or off according to whether or not voltage is applied thereto, thereby reducing a cell gap of a liquid crystal layer, and a stereoscopic display device using the same.

2. Discussion of the Related Art

At present, services for rapid dissemination of information, to be constructed based on high-speed information communication networks, have developed from a simple "listening and speaking" service, such as current telephones, to a "watching and listening" multimedia type service based on digital terminals used for high-speed processing of characters, voices and images, and are expected to be ultimately developed into hyperspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference between the two eyes. Such an image difference due to the positional difference between the two eyes is called binocular disparity. A 3-dimensional stereoscopic image display device is designed based on binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately combines the images, reproducing depth perception and realism of an original 3-dimensional (3D) image. This ability is conventionally referred to as stereography (stereoscopy), and a display device to which stereoscopy is applied is referred to as a stereoscopic display device.

In the meantime, stereoscopic display devices may be classified based on constituent elements of a lens which realizes 3-dimensional images. In one example, a lens using a liquid crystal layer is referred to as an electrically-driven liquid crystal lens.

Generally, a liquid crystal display device includes two electrodes opposite each other, and a liquid crystal layer interposed between the two electrodes. Liquid crystal molecules of the liquid crystal layer are driven by an electric field created when voltages are applied to the two electrodes. The liquid crystal molecules have polarization and optical anisotropy characteristics. Here, polarization refers to a change in molecular arrangement direction according an electric field, which is caused as electrons in liquid crystal molecules are gathered to opposite sides of the liquid crystal molecules when the liquid crystal molecules are under the influence of an electric field. Also, optical anisotropy refers to a change in path or polarization of light to be emitted according to an incidence direction or polarization of incident light, which is caused by an elongated shape of liquid crystal molecules and the above-mentioned molecular arrangement direction.

Accordingly, the liquid crystal layer has a transmittance difference due to voltages applied to the two electrodes, and is able to display an image by varying the transmittance difference on a per pixel basis.

Recently, there has been proposed an electrically-driven liquid crystal lens in which a liquid crystal layer serves as a lens based on the above-described characteristics of liquid crystal molecules.

Specifically, a lens is designed to control a path of incident light on a per position basis using a difference between a refractive index of a lens constituent material and a refractive index of air. In the electrically-driven liquid crystal lens, if different voltages are applied to electrodes located at different positions of the liquid crystal layer so as to create an electric field required to drive the liquid crystal layer, incident light introduced into the liquid crystal layer undergoes different phase variations on a per position basis, and as a result, the liquid crystal layer is able to control the path of the incident light in the same manner as an actual lens.

Hereinafter, an electrically-driven liquid crystal lens of related art will be described with reference to the accompanying drawings.

Figure 1:
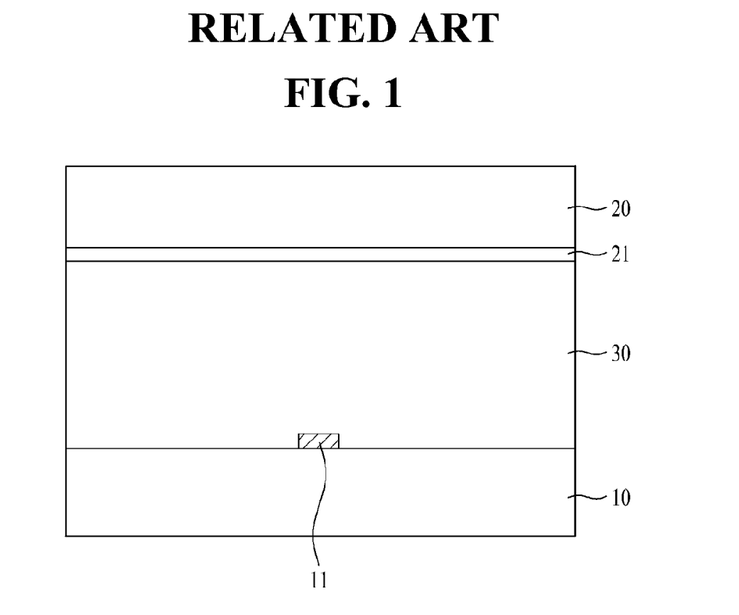
FIG. 1 is a sectional view illustrating an electrically-driven liquid crystal lens of related art.
Figure 2:
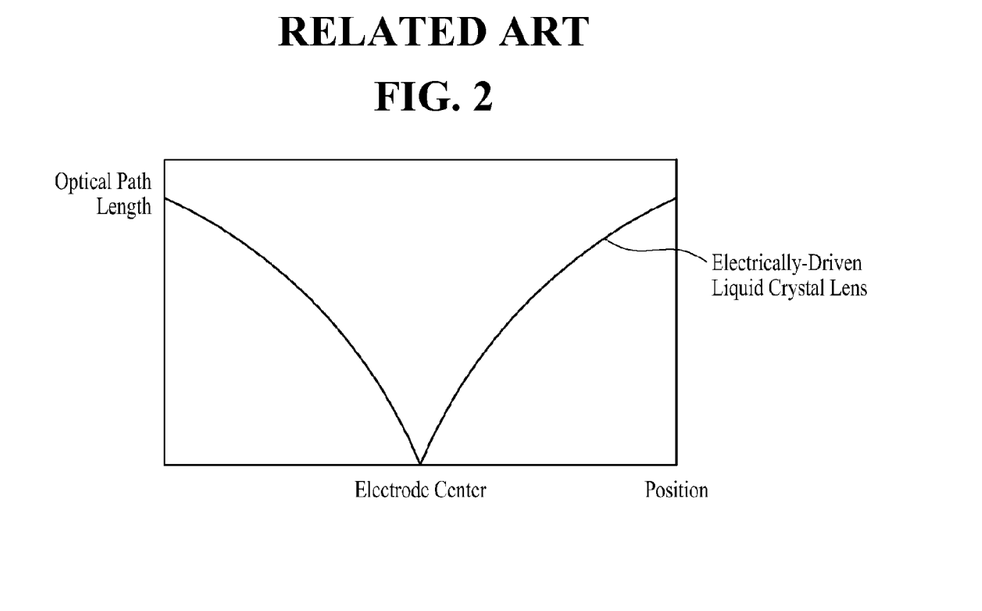
FIG. 2 is a view illustrating a potential distribution after a voltage is applied to the electrically-driven liquid crystal lens of FIG. 1.

FIG. 1 is a sectional view illustrating an electrically-driven liquid crystal lens of the related art, and FIG. 2 is a schematic view illustrating a potential distribution of the electrically-driven liquid crystal lens of FIG. 1 after voltage is applied to the electrically-driven liquid crystal lens.

As illustrated in FIG. 1, the electrically-driven liquid crystal lens includes first and second substrates 10 and 20 opposite each other, and a liquid crystal layer 30 formed between the first substrate 10 and the second substrate 20.

First electrodes 11 are arranged on the first substrate 10 and are spaced apart from one another by a first distance. In the two neighboring first electrodes 11, a distance from the center of one first electrode 11 to the center of the other first electrode 11 is referred to as a "pitch". Repeating the same pitch for the respective first electrodes results in a pattern.

A second electrode 21 is formed over the entire surface of the second substrate 20 opposite the first substrate 10.

The first and second electrodes 11 and 21 are made of transparent metal. The liquid crystal layer 30 is formed in a space between the first electrodes 11 and the second electrode 21. Liquid crystal molecules of the liquid crystal layer 30 have a parabolic potential surface due to a property reacting according to the intensity and distribution of an electric field and thus, have a phase distribution similar to that of the electrically-driven liquid crystal lens as illustrated in FIG. 2.

The above-described electrically-driven liquid crystal lens is realized under the condition that high voltages are applied to the first electrode 11 and the second electrode 21 is grounded. With this voltage condition, a vertical electric field is strongest at the center of the first electrode 11, and the intensity of the vertical electric field decreases away from the first electrode 11. Accordingly, if the liquid crystal molecules of the liquid crystal layer 30 have positive dielectric anisotropy, the liquid crystal molecules are arranged according to the electric field in such a way that the liquid crystal molecules are upright at the center of the first electrode 11 and are gradually tilted approximately horizontally away from the first electrode 11. As a result, in view of light transmission, an optical path is shortened at the center of the first electrode 11, and is lengthened with increasing distance from the first electrode 11, as illustrated in FIG. 2. Representing the length variation of the optical path using a phase surface, the electrically-driven liquid crystal lens has light transmission effects similar to a lens having a parabolic surface.

Here, the second electrode 21 causes behavior of the electric field created by the liquid crystal molecules, making a refractive index of light spatially take the form of a parabolic function. The first electrode 11 corresponds to a lens edge region.

In this case, relatively high voltages are applied to the first electrodes 11 than the second electrode 21. Therefore, as illustrated in FIG. 2, an electric potential difference occurs between the first electrodes 11 and the second electrode 21. In particular, a steep lateral electric field is created around the first electrodes 11. Accordingly, liquid crystals have a slightly distorted distribution rather than a gentle distribution, whereby a refractive index of light cannot exhibit parabolic spatial distribution, or movement of the liquid crystals is excessively sensitive to voltage variation.

The above-described electrically-driven liquid crystal lens of the related art may be realized, without a lens having a parabolic surface, by arranging electrodes on two substrates with liquid crystals interposed therebetween and applying voltages to the electrodes.

The above described electrically-driven liquid crystal lens has the following problems.

Firstly, since the electrodes formed on the lower substrate are positioned at only a part of a lens region, a steep lateral electric field, rather than a gentle electric field, is created between a lens edge region corresponding to the electrode and a lens center region distant from the lens edge region, resulting in a slightly distorted phase of the electrically-driven liquid crystal lens. In particular, in the electrically-driven liquid crystal lens that is driven by a liquid crystal field, since the greater the pitch of lens regions, the smaller the number of electrodes to which high voltages are applied, an insufficient electric field is created between the high voltage electrodes and a substrate opposite these electrodes. Accordingly, it becomes difficult to form the electrically-driven liquid crystal lens having a gentle parabolic lens surface, which has the same effects as an actual lens.

Secondly, when being applied to a large-area display device, the lens center region, which is distant from the lens edge region where the electrode, to which high-voltage is applied, is located, is substantially unaffected by an electric field and has a difficulty in alignment control of liquid crystals by the electric field. As occasion demands, if the alignment control in the lens center region is difficult or impossible, the resulting electrically-driven liquid crystal lens has a discontinuous lens profile and is ineffective as a lens.

Thirdly, since a vertical electric field, created between an electrode to which a high voltage is applied and an electrode formed over the entire surface of a substrate opposite the high voltage electrode, causes a high height, i.e. high sag of the electrically-driven liquid crystal lens and also, the electrically-driven liquid crystal lens requires upper and lower sag margins, a great quantity of liquid crystals may be required to form the entire electrically-driven liquid crystal lens. In particular, since the greater the sag of the electrically-driven liquid crystal lens, the greater the quantity of liquid crystals on a per volume basis, this may result in cost increase and serious deterioration in process efficiency.

Fourthly, a focal distance of the electrically-driven liquid crystal lens is inversely proportional to the sag of the electrically-driven liquid crystal lens. To fabricate an electrically-driven liquid crystal lens having a short focal distance, there is a need for a liquid crystal layer having a large thickness and this becomes a main factor of cost increase. In particular, since the quantity of very expensive liquid crystals increases on a per volume basis as a cell gap increases, there is increasing a demand to reduce the cell gap.

In the electrically-driven liquid crystal lens of the related art, to assure a constant lens profile, the thickness of the liquid crystal layer, i.e. the cell gap must be 30 µm or more and in particular, in the case of a large-area one having a large pitch, the thickness of the liquid crystal layer is further increased. However, an array process for a display panel, such as a liquid crystal panel, forms a cell gap of 10 µm or less, and therefore, is difficult to form the above described high large cell gap of the liquid crystal layer. That is, a current array process forming a liquid crystal panel is difficult to form the liquid crystal layer of the above described electrically-driven liquid crystal lens.

Fifthly, although a Fresnel lens has been proposed in an effort to reduce the above described cell gap, the Fresnel lens has discontinuous surfaces between the respective neighboring sub regions of each lens region having different maximum height points, and thus, causes deterioration in display grade.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An object of the present invention is to provide an electrically-driven liquid crystal lens which includes a light shade to be switched on or off according to whether or not voltage is applied thereto, thereby reducing a cell gap of a liquid crystal layer, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrically-driven liquid crystal lens includes a first substrate and a second substrate arranged opposite each other and each including a plurality of lens regions and a light shade provided at a boundary of each lens region, a plurality of first electrodes formed in a given direction on the first substrate in each lens region, a second electrode formed on one surface of the second substrate and having an aperture corresponding to the light shade, first and second light shade switching electrodes formed at opposite ends of the light shade and extending parallel to the first electrodes, a liquid crystal layer filled between the first substrate and the second substrate, and a polarizer plate formed on the other surface of the second substrate and having a first transmission axis.

The electrically-driven liquid crystal lens may further include a first voltage source to create a vertical electric field between the plurality of first electrodes and the second electrode, and a second voltage source to create a horizontal electric filed between the first and second light shade switching electrodes.

The first voltage source may apply voltages, which gradually increase from a center to the boundary of the lens region, to the first electrodes.

Liquid crystals in the light shade may be aligned to follow a direction crossing the first transmission axis when the second voltage source applies different voltages to the first and second light shade switching electrodes. In this case, a 2-dimensional (2D) image signal may be transmitted along the first transmission axis from a display panel below the first substrate.

The plurality of first electrodes may be formed in the same layer on the first substrate. The electrically-driven liquid crystal lens may further include at least one insulating film on the first substrate, and the plurality of first electrodes may be divided onto the first substrate and the insulating film, and the first electrodes on the first substrate and the first electrodes on the insulating film may be arranged at alternating positions.

In accordance with another aspect of the present invention, a stereoscopic display device includes an electrically-driven liquid crystal lens including a first substrate and a second substrate arranged opposite each other and each including a plurality of lens regions and a light shade provided at a boundary of each lens region, a plurality of first electrodes formed in a given direction on the first substrate in each lens region, a second electrode formed on one surface of the second substrate and having an aperture corresponding to the light shade, first and second light shade switching electrodes formed at opposite ends of the light shade and extending parallel to the first electrodes, and a liquid crystal layer filled between the first substrate and the second substrate, a display panel located below the electrically-driven liquid crystal lens to transmit a 2-dimensional (2D) image signal, a first polarizer plate located between the display panel and the electrically-driven liquid crystal lens and having a first transmission axis, a second polarizer plate located on the electrically-driven liquid crystal lens and having the same transmission axis as the first transmission axis, a first voltage source to create a vertical electric field between the plurality of first electrodes and the second electrode on a per lens region basis, and a second voltage source to create a horizontal electric filed between the first and second light shade switching electrodes.

The first and second voltage sources may be switched off to perform display of a 2D image, and the first and second voltage sources may be switched on to perform display of a 3-dimensional (3D) image.

The plurality of first electrodes and the second electrode may be made of transparent electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

Figure 3:
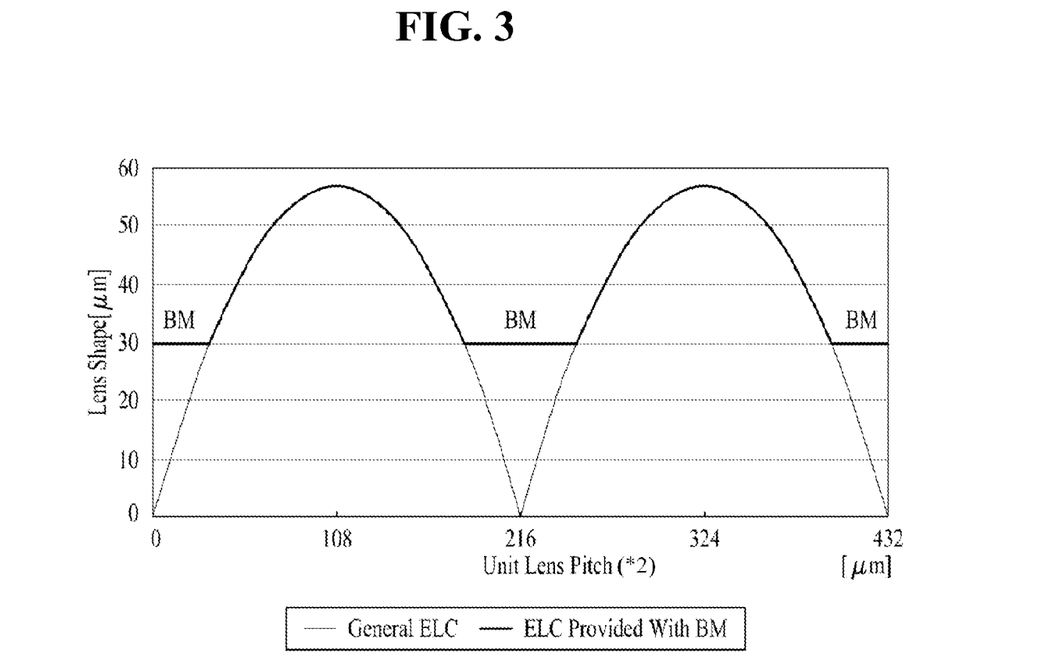
FIG. 3 is a view comparing lens effects and cell gaps between the electrically-driven liquid crystal lens according to the present invention and a general electrically-driven liquid crystal lens.

FIG. 3 is a view comparing lens effects and cell gaps between the electrically-driven liquid crystal lens according to the present invention and a general electrically-driven liquid crystal lens.

As illustrated in FIG. 3, the electrically-driven liquid crystal lens of the present invention includes a light shade BM formed at a boundary of a lens region. The light shade BM serves to reduce a cell gap to half or less that of a general electrically-driven liquid crystal lens.

When the light shade covers a boundary of a desired unit lens region of the electrically-driven liquid crystal lens (here, the boundary corresponds to a lens edge region where neighboring lens regions meet), it is possible to reduce the thickness of a cell gap by the same value as the width of the light shade.

It is noted that the light shade BM causes brightness deterioration equal to the width covered by the light shade BM upon display of a 3-dimensional (3D) image (stereoscopic display). Therefore, it is important to optimize a ratio of the width of the light shade BM to a reduced cell gap thickness.

In the illustrated embodiment, only half a desired lens height of a lens region is realized and the remaining lens region is covered by the light shade. In this case, although light loss of about 27% occurs, the resulting cell gap can be reduced to 50% of a general cell gap thickness. However, it is also possible to reduce the cell gap thickness to half or more the cell gap thickness of the related art. The cell gap thickness and the width of the light shade are set in consideration of brightness upon display of a 3D image.

In this case, the light shade may be switched on or off by an electric field. Upon formation of a 2-dimensional (2D) image, the light shade is switched off such that a 2D image signal transmitted from a display panel below the light shade is directly emitted through a corresponding light shade region and thus, there is no brightness deterioration.

The width of the light shade may be changed according to a pitch and a desired cell gap, and is set in consideration of brightness required for display of a 3D image and a realizable cell gap thickness.

Figure 4:
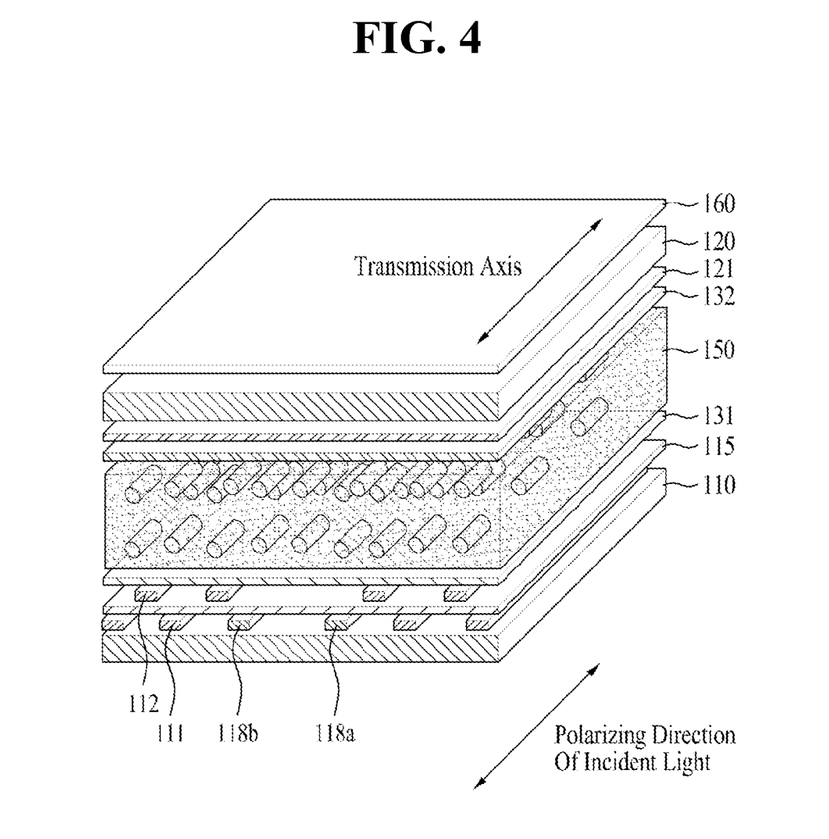
FIG. 4 is a perspective view of the electrically-driven liquid crystal lens according to the present invention.
Figure 5:
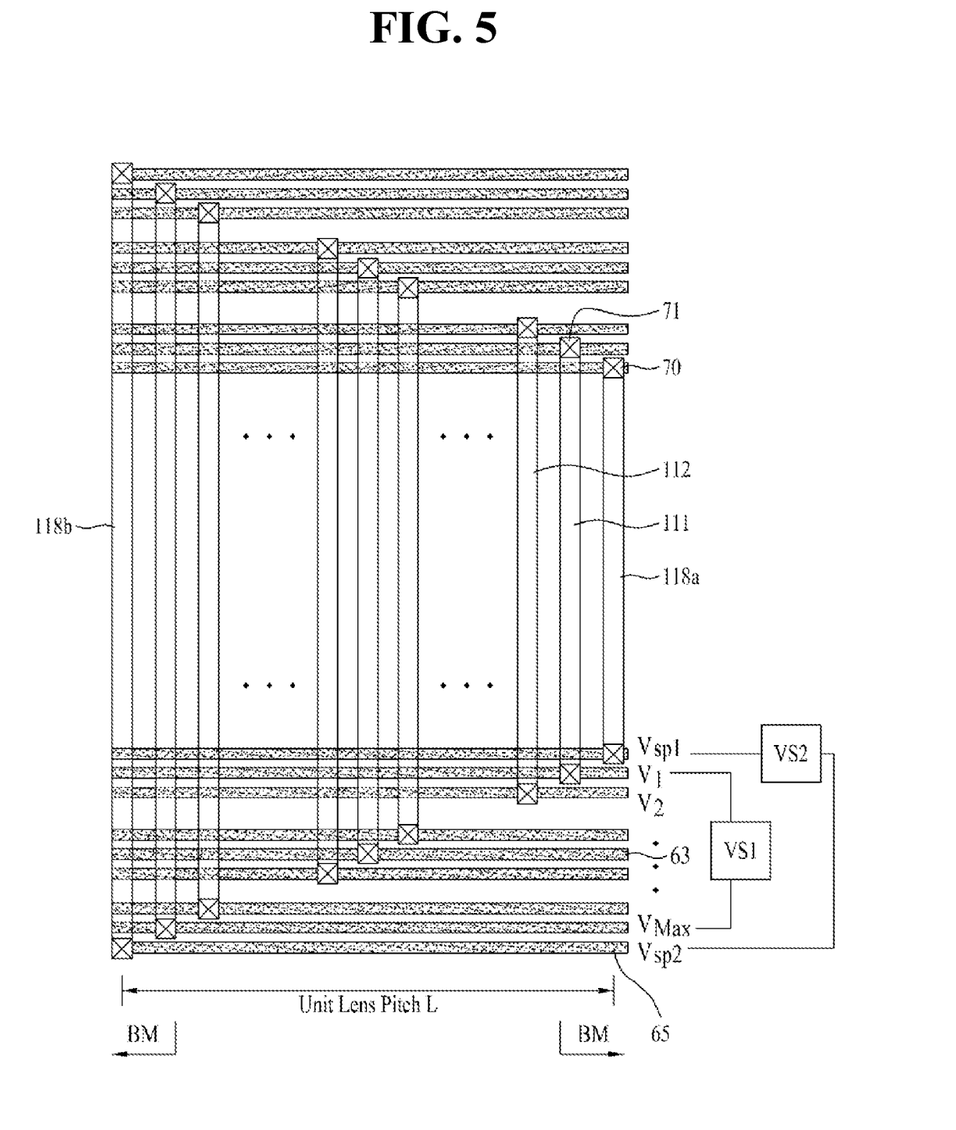
FIG. 5 is a plan view illustrating a configuration of electrodes on a first substrate of the electrically-driven liquid crystal lens according to the present invention.

FIG. 4 is a perspective view of the electrically-driven liquid crystal lens according to the present invention, and FIG. 5 is a plan view illustrating a configuration of electrodes on a first substrate of the electrically-driven liquid crystal lens according to the present invention.

As illustrated in FIG. 4, the electrically-driven liquid crystal lens according to the present invention includes a plurality of lens regions, and a light shade BM is defined at a boundary of each lens region. As described above, the light shade BM is switched on or off according to whether or not voltage is applied. When it is desired to display a 2D image, the light shade BM is switched off to directly emit a 2D image transmitted from a display panel therebelow. That is, the light shade BM is a switchable black matrix.

Considering the electrically-driven liquid crystal lens according to the present invention in detail, the electrically-driven liquid crystal lens includes a first substrate 110 and a second substrate 120 arranged opposite each other, a plurality of first electrodes 111 and 112 formed in a given direction on the first substrate 110 in each lens region, a second electrode 121 formed on the second substrate 120 and having an aperture OP corresponding to the light shade, first and second light shade switching electrodes 118a and 118b formed parallel to the first electrodes 111 and 112 at opposite ends of the light shade, a liquid crystal layer 150 filled between the first substrate 110 and the second substrate 120, and a polarizer plate 160 formed on a surface of the second substrate 120 and having a transmission axis.

The electrically-driven liquid crystal lens further includes a first voltage source VS1 to create a vertical electric field between the plurality of first electrodes 111 and 112 and the second electrode 121, and a second voltage source VS2 to create a horizontal electric field between the first and second light shade switching electrodes 118a and 118b. The electrically-driven liquid crystal lens performs display of a 3D image upon receiving corresponding voltages from these voltage sources VS1 and VS2. More specifically, the first and second voltage sources VS1 and VS2 apply voltages to the first and second light shade switching electrodes 118a and 118b, enabling display of a 3D image.

If no voltage is applied from the first and second voltage sources VS1 and VS2 to the first electrodes 111 and 112, the second electrode 121 and the light shade switching electrodes 118a and 118b, a 2D image emitted from a display panel located below the electrically-driven liquid crystal lens is displayed.

As illustrated in FIG. 5, the first voltage source VS1 applies voltages Vmax, . . . V1, which gradually increase from the center to the boundary of the lens region, to the first electrodes 111 and 112. These voltage sources apply voltages to metal pads 63 provided at one end of the respective first electrodes 111 and 112 extending in the given direction. Here, the first electrodes 111 and 112 are transparent electrodes and are connected at one end thereof to the metal pads 63 via pad contact holes 71. The metal pads 63 are located at an outer periphery of a display part of the electrically-driven liquid crystal lens.

The first electrodes 111 and 112, as illustrated in FIG. 4, may be formed in different layers on the first substrate 110 with an insulating film 115 interposed therebetween, or may be formed in the same layer. In addition, although the embodiment illustrates that the first electrodes 111 and 112 are densely arranged with a small distance therebetween, the first electrodes 111 and 112 may be formed in the same layer if a distance therebetween is further increased.

The second electrode 121 includes the aperture Op located at each lens edge region, and the remaining region of the second electrode 121 except for the aperture OP has an integrally connected shape on the second substrate 120.

The second voltage source VS2 applies different voltages to the first and second light shade switching electrodes 118a and 118b, thereby creating a horizontal electric field between the two electrodes.

When the second voltage source VS2 applies different voltages to the first and second light shade switching electrodes 118a and 118b, preferably, liquid crystals in the light shade are aligned to follow a direction crossing the transmission axis of the polarizer plate 160. Accordingly, liquid crystal molecules between the first and second light shade switching electrodes 118a and 118b in the light shade, which are driven by the horizontal electric field, are aligned in a direction crossing the transmission axis of the polarizer plate 160. This causes the light shade so as not to be seen, allowing the light shade to function as a black matrix when voltage is applied.

In this case, a 2D image signal is transmitted along the transmission axis from a display panel (200, see FIG. 7) below the first substrate 110. Here, a polarizer plate on the display panel and the polarizer plate on the electrically-driven liquid crystal lens have the same directional transmission axis, which crosses an alignment direction of liquid crystals caused when voltage is applied.

In addition, as illustrated in FIG. 5, the second voltage source VS2 applies different voltage signals Vsp1 and Vsp2 to the first and second light shade switching electrodes 118a and 118b at the boundary of each lens region. To this end, the first and second light shade switching electrodes 118a and 118b are connected to metal pads 65 formed at one end or both ends thereof. The first and second light shade switching electrodes 118a and 118b in the form of transparent electrodes and the metal pads 65 are formed in different layers and are connected to the metal pads 65 via pad contact holes 70. In this case, the metal pads 65 are located at the outer periphery of the display part of the electrically-driven liquid crystal lens.

The light shade is formed between the two neighboring lens regions, and the width of the light shade is the sum of half that of one lens region and half that of the other lens region. Specifically, a region, which is located at either end of the lens region L and is designated by reference characters BM, has a width half the width of the light shade.

When voltages are applied to the neighboring first electrodes 111 and 112, a voltage difference between the first electrodes is 1V or less to prevent generation of a strong horizontal electric field between the first electrodes 111 and 112.

The plurality of first electrodes 111 and 112 in the lens region L is horizontally symmetrically formed on the basis of the edge of the lens region.

Here, the lowest threshold voltage V1 applied to the first electrode 111 or 112 corresponding to the center O of the lens region L is an Alternating Current (AC) square wave voltage having a peak value of about 1.4-2V. The threshold voltage V1 is calculated by expression of $$V = \pi \sqrt{\frac{K1}{\Delta \varepsilon \varepsilon 0}}$$

(where, $\Delta \epsilon$ is the dielectric anisotropy of liquid crystals, K1 is the modulus of elasticity of liquid crystals, and $\epsilon_o$ is a free-space dielectric constant). In addition, the highest voltage Vmax applied to the first electrodes 111 and 112 corresponding to the edge E of the lens region L is an AC square wave voltage having a peak value of about 2.5~10V.

In this case, a ground voltage or a voltage smaller than a threshold voltage is applied to the second electrode 121. In this case, a pattern of the second electrode 121 corresponding to the light shade is removed and thus, no vertical electric field is created in the light shade.

Reference numerals 131 and 132 represent first and second alignment films. To allow the electrically-driven liquid crystal lens to function as a transparent layer in an initial state in which no voltage is applied, a rubbing direction of the first alignment film 131 may be parallel to or perpendicular to a longitudinal direction of the first electrodes 111 and 112. In this case, the second alignment film 132 has a rubbing direction crossing or anti-parallel to the rubbing direction of the first alignment film 131. Thereby, an image transmitted from the display panel below the electrically-driven liquid crystal lens is directly transmitted to the viewer.

The plurality of first electrodes 111 and 112 has a bar shape extending in a given direction along a longitudinal direction of the first substrate 110 or the insulating film 115 (i.e. a direction of one side of the first substrate 110). The width of each first electrode 111 or 112 is 1~10 μm, and a distance between the neighboring first electrodes 111 and 112 is 1~10 μm. For example, the pitch is variously variable in a range of 90~1000 μm. According to the above-described width and distance of the first electrodes 111 and 112, approximately ten to one hundred or more first electrodes can be formed on a per lens region basis.

Although not shown, a seal pattern (not shown) is formed at outer peripheral region of the first and second substrates 110 and 120 (i.e. a non-display region including a pad portion) to maintain a gap between the first substrate 110 and the second substrate 120. The liquid crystal layer 150 between the first substrate 110 and the second substrate 120 may be reduced in thickness to 30 μm or less with provision of the light shade. To stably maintain the thickness of the liquid crystal layer 150, ball spacers or column spacers may be further provided to support the cell gap between the first substrate 110 and the second substrate 120. In this case, it is advantageous to position the spacers so as not to distort the phase of the electrically-driven liquid crystal lens.

Although the first and second light shade switching electrodes 118a and 118b may be formed of metal as occasion demands, the first and second light shade switching electrodes 118a and 118b may be formed in the same layer as the first electrodes 111 and 112 in the form of transparent electrodes. This may result in an abbreviated process sequence.

As the first electrodes 111 and 112 having the same width are arranged on the first substrate 110 and voltages gradually decreasing from the edge E to the center O of the lens region L are applied to the first electrodes 111 and 112, a gentle vertical electric field is generated between the first electrodes 111 and 112 and the second electrode 121 and a slight horizontal electric field is generated between the neighboring first electrodes 111 and 112. Consequently, a gentle lateral electric field may be observed, in which the intensity of the electric field is high at the edge E of the lens region L and is low at the center O of the lens region L.

Representing the length of an optical path of liquid crystals aligned on a per position basis of an electric field, it can be appreciated that the electrically-driven liquid crystal lens has a shape similar to a gentle parabolic lens, in which the edge E of the lens region L has the shortest optical path and the center O of the lens region L has the longest optical path.

Here, the voltages applied to the first electrodes 111 and 112 and the second electrode 121 causes behavior of the electric field created by the liquid crystal molecules, making a refractive index of light spatially take the form of a parabolic function.

The width and distance of the first electrodes 111 and 112 may have equal values, or one of the width and distance may have an unequal value, or both the width and the distance may have unequal values. Changes in the width and distance of the first electrodes may depend on a lens profile.

Figure 6:
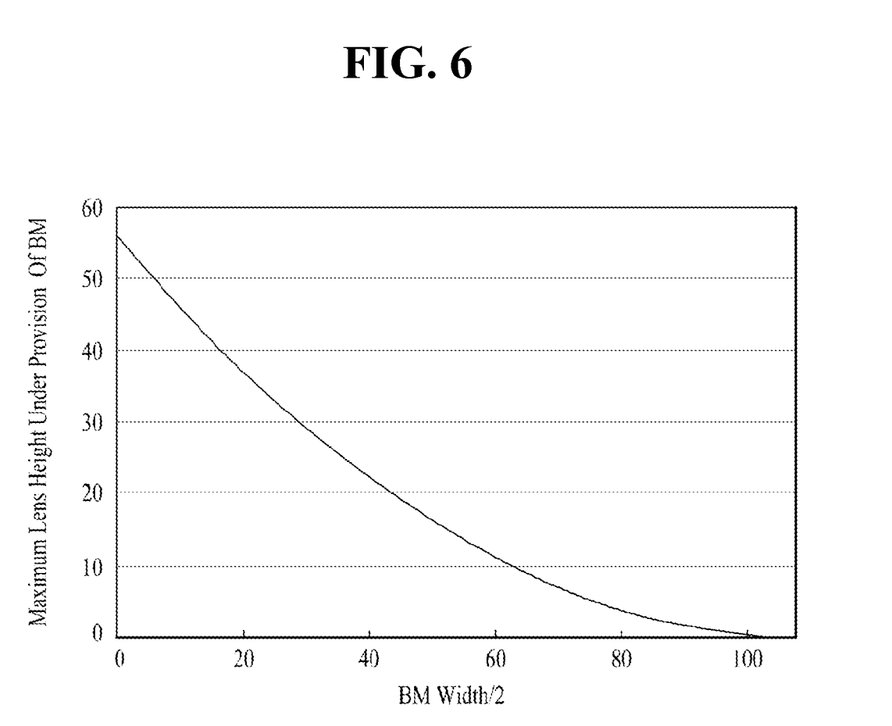
FIG. 6 is a graph illustrating a relationship between the maximum lens height and the width of a light shade provided in the electrically-driven liquid crystal lens according to the present invention.

FIG. 6 is a graph illustrating a relationship between the maximum lens height and the width of the light shade provided in the electrically-driven liquid crystal lens according to the present invention.

As illustrated in FIG. 6, considering a relationship between the cell gap thickness and the width of the light shade BM, the width of the light shade BM is proportional to the square of a reduced cell gap thickness.

Since an ideal lens takes the form of a quadratic function, a lens sag (i.e. a desired lens height) is reduced as much as the square of the width of the light shade.

In addition, since the cell gap of the liquid crystal layer is proportional to the lens sag, the smaller the lens sag, the smaller the cell gap.

The cell gap of the related art corresponds to 110~130% of the maximum lens height. Although a desired cell gap is slightly changed according to an application model, the electrically-driven liquid crystal lens of the present invention may achieve a reduced cell gap equal to half or less that of the cell gap of the related art owing to the above described switchable light shade.

The width of the light shade and the cell gap represent a trade-off as described above, and may be set according to a corresponding model.

Figure 7:
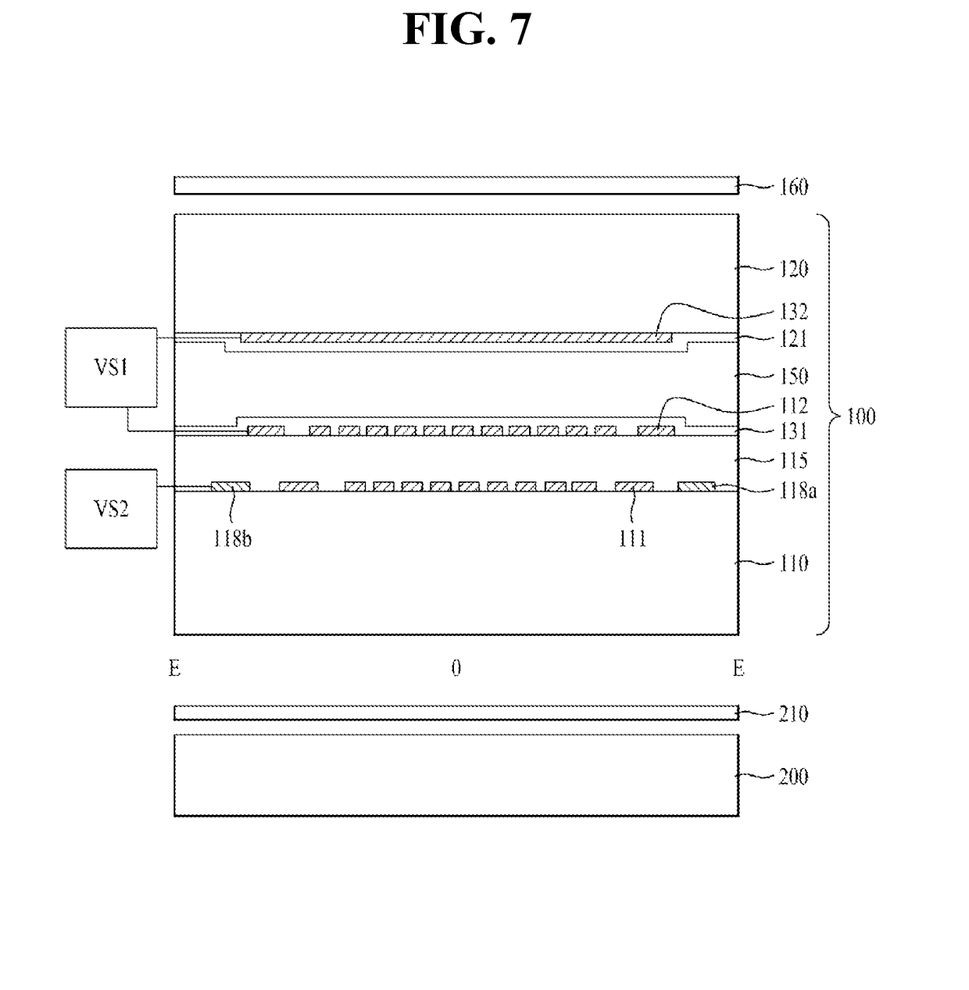
FIG. 7 is a sectional view illustrating a stereoscopic display device according to the present invention.

FIG. 7 is a sectional view illustrating a stereoscopic display device including the electrically-driven liquid crystal lens according to the present invention.

As illustrated in FIG. 7, the stereoscopic display device of the present invention includes the above described electrically-driven liquid crystal lens 100, a display panel 200, which is disposed below the electrically-driven liquid crystal lens 100 and serves to transmit a 2D image signal, a first polarizer plate 210 located between the display panel 200 and the electrically-driven liquid crystal lens 100 and having a first transmission axis, a second polarizer plate 160 located on the electrically-driven liquid crystal lens 100 and having the same transmission axis as the first transmission axis, the first voltage source VS1 to apply voltages, which gradually increase from the center to the edge of the lens region, to the first electrodes 111 and 112 in each lens region and to apply a common voltage to the second electrode 121, and the second voltage source VS2 to apply a voltage required to drive liquid crystals in a direction crossing the first transmission axis between the first and second light shade switching electrodes 118a and 118b.

The first and second voltage sources VS1 and VS2 may be switched off to enable display of a 2D image, or may be switched on to enable display of a 3D image.

The display panel 200 may be selected from various flat-panel displays including a Liquid Crystal Display (LCD), Organic Light Emitting Display (OLED), Plasma Display Panel (PDP), Field Emission Display (FED), etc. The display panel 200 is located below the electrically-driven liquid crystal lens 100, and serves to transmit a 2D image signal to the electrically-driven liquid crystal lens 100.

As apparent from the above description, an electrically-driven liquid crystal lens and a stereoscopic display device using the same according to the present invention have the following effects.

Firstly, to assure a precise and stable profile of the electrically-driven liquid crystal lens, a lower plate is provided with first finely split electrodes and different voltages are applied to the first electrodes, such that a vertical electric filed is created between the first electrodes and a second electrode formed on an upper plate, providing the electrically-driven liquid crystal lens with a gentle parabolic lens shape.

Secondly, as a light shade is provided to correspond to a boundary of a lens region, it is possible to reduce a call gap. The boundary of the lens region has a high crosstalk region and it is possible to reduce the cell gap without significant brightness loss. In particular, instead of causing crosstalk at each boundary between neighboring ones of a plurality of sub regions divided in each lens region like a Fresnel lens, the light shade is provided to correspond to a region between lens regions where originally exhibits crosstalk, achieving a reduction in cell gap without deterioration in display grade.

Thirdly, the light shade may be switched on or off. For example, the light shade may be switched off when it is desired to perform display of a 2D image. In this case, even the light shade takes parts in image display without a physically covered space. That is, provision of a switchable black matrix may improve an aperture ratio and brightness upon display of a 2D image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrically-driven liquid crystal lens comprising:
    a first substrate and a second substrate arranged opposite each other and each including a plurality of lens regions and a light shade provided at a boundary of each lens region;
    a plurality of first electrodes formed in a given direction on the first substrate in each lens region;
    a second electrode formed on one surface of the second substrate and having an aperture corresponding to the light shade;
    first and second light shade switching electrodes formed at opposite ends of the light shade and extending parallel to the first electrodes;
    a liquid crystal layer filled between the first substrate and the second substrate;
    a first voltage source to create a vertical electric field between the plurality of first electrodes and the second electrode;
    a second voltage source to create a horizontal electric filed between the first and second light shade switching electrodes; and
    a polarizer plate formed on the other surface of the second substrate and having a first transmission axis,
    wherein liquid crystals in the light shade are aligned to follow a direction crossing the first transmission axis when the second voltage source applies different voltages to the first and second light shade switching electrodes.

2. The lens according to claim 1, wherein the first voltage source applies voltages, which gradually increase from a center to the boundary of the lens region, to the first electrodes.

3. The lens according to claim 1, wherein a 2-dimensional (2D) image signal is transmitted along the first transmission axis from a display panel below the first substrate.

4. The lens according to claim 1, wherein the plurality of first electrodes is formed in the same layer on the first substrate.

5. The lens according to claim 1, further comprising at least one insulating film on the first substrate,
    wherein the plurality of first electrodes is divided onto the first substrate and the insulating film, and the first electrodes on the first substrate and the first electrodes on the insulating film are arranged at alternating positions.

6. A stereoscopic display device comprising:
    an electrically-driven liquid crystal lens including a first substrate and a second substrate arranged opposite each other and each including a plurality of lens regions and a light shade provided at a boundary of each lens region, a plurality of first electrodes formed in a given direction on the first substrate in each lens region, a second electrode formed on one surface of the second substrate and having an aperture corresponding to the light shade, first and second light shade switching electrodes formed at opposite ends of the light shade and extending parallel to the first electrodes, and a liquid crystal layer filled between the first substrate and the second substrate;
    a display panel located below the electrically-driven liquid crystal lens to transmit a 2-dimensional (2D) image signal;
    a first polarizer plate located between the display panel and the electrically-driven liquid crystal lens and having a first transmission axis;
    a second polarizer plate located on the electrically-driven liquid crystal lens and having the same transmission axis as the first transmission axis;
    a first voltage source to create a vertical electric field between the plurality of first electrodes and the second electrode on a per lens region basis; and
    a second voltage source to create a horizontal electric filed between the first and second light shade switching electrodes
    wherein liquid crystals in the light shade are aligned to follow a direction crossing the first transmission axis when the second voltage source applies different voltages to the first and second light shade switching electrodes.

7. The device according to claim 6, wherein:
    the first and second voltage sources are switched off to perform display of a 2D image; and
    the first and second voltage sources are switched on to perform display of a 3-dimensional (3D) image.

8. The device according to claim 6, wherein the plurality of first electrodes and the second electrode are made of transparent electrodes.

* * * * *